United States Patent
Hwang et al.

(10) Patent No.: US 10,029,648 B2
(45) Date of Patent: Jul. 24, 2018

(54) PREMISES SECURITY

(71) Applicant: Vivint, Inc., Provo, UT (US)

(72) Inventors: Jungtaik Hwang, Draper, UT (US); Matthew J. Eyring, Provo, UT (US); Jeremy B. Warren, Draper, UT (US); James Ellis Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 457 days.

(21) Appl. No.: 14/477,724

(22) Filed: Sep. 4, 2014

(65) Prior Publication Data

US 2015/0062343 A1 Mar. 5, 2015

Related U.S. Application Data

(60) Provisional application No. 61/873,526, filed on Sep. 4, 2013.

(51) Int. Cl.
| | |
|---|---|
| *G08B 13/14* | (2006.01) |
| *G08B 29/00* | (2006.01) |
| *H04N 7/18* | (2006.01) |
| *B60R 25/102* | (2013.01) |
| *G08B 13/196* | (2006.01) |
| *G08B 13/04* | (2006.01) |
| *G08B 13/183* | (2006.01) |

(52) U.S. Cl.
CPC ...... *B60R 25/102* (2013.01); *G08B 13/19647* (2013.01); *G08B 13/19697* (2013.01); *G08B 13/04* (2013.01); *G08B 13/1436* (2013.01); *G08B 13/183* (2013.01); *H04N 7/183* (2013.01)

(58) Field of Classification Search
CPC ........ G08B 13/19682; G08B 13/19695; G08B 13/19697; G08B 25/009
See application file for complete search history.

(56) References Cited

U.S. PATENT DOCUMENTS

| | | | | |
|---|---|---|---|---|
| 6,392,692 B1* | 5/2002 | Monroe | ............ | B64D 45/0015 340/506 |
| 6,970,183 B1* | 11/2005 | Monroe | ................ | G08B 7/062 348/143 |
| 9,472,067 B1* | 10/2016 | Jentoft | .................... | G08B 13/00 |
| 2003/0005332 A1* | 1/2003 | Horikiri | ........... | G08B 13/19602 726/11 |
| 2003/0025599 A1* | 2/2003 | Monroe | ........... | G08B 13/19602 340/531 |

(Continued)

*Primary Examiner* — Rebecca Volentine
(74) *Attorney, Agent, or Firm* — Holland & Hart LLP

(57) ABSTRACT

A computer-implemented method for premises security is described. In one embodiment, a person passing through a perimeter of a predefined area is detected via a boundary sensor. Upon detecting the person passing through the perimeter of the predefined area, a camera is activated to capture an image of the person, the camera being positioned in relation to the predefined area. A notification is sent to a user determined to be nearest to the predefined area. The notification may include the image of the person. A proximity of a person in relation to a vehicle is detected via a proximity sensor. Upon determining the proximity of the person satisfies a predetermined threshold, a notification is sent to a user. Upon determining the proximity of the person satisfies the predetermined threshold, a camera positioned in relation to the vehicle is activated.

11 Claims, 9 Drawing Sheets

(56) References Cited

U.S. PATENT DOCUMENTS

| | | | |
|---|---|---|---|
| 2004/0046661 A1* | 3/2004 | Vaccaro | G08B 13/124 340/557 |
| 2004/0150716 A1* | 8/2004 | Ho | B60Q 9/005 348/148 |
| 2004/0223056 A1* | 11/2004 | Norris, Jr. | G08B 13/183 348/152 |
| 2006/0238347 A1* | 10/2006 | Parkinson | G08B 13/1436 340/572.4 |
| 2007/0080806 A1* | 4/2007 | Lax | E05B 73/0017 340/572.1 |
| 2007/0262857 A1* | 11/2007 | Jackson | G08B 13/19656 340/506 |
| 2008/0086391 A1* | 4/2008 | Maynard | G06Q 10/087 705/28 |
| 2008/0292146 A1* | 11/2008 | Breed | B60N 2/002 382/118 |
| 2009/0167862 A1* | 7/2009 | Jentoft | G08B 13/19641 348/143 |
| 2010/0198463 A1* | 8/2010 | Plaster | B60R 25/102 701/45 |
| 2010/0289644 A1* | 11/2010 | Slavin | G08B 13/2402 340/568.1 |
| 2014/0120860 A1* | 5/2014 | Amis | G08B 25/005 455/404.1 |
| 2014/0132772 A1* | 5/2014 | Billau | G08B 13/19682 348/159 |
| 2014/0200737 A1* | 7/2014 | Lortz | B60R 25/25 701/1 |
| 2014/0306799 A1* | 10/2014 | Ricci | B60Q 1/00 340/5.83 |
| 2014/0313338 A1* | 10/2014 | Kondo | G05B 15/02 348/148 |

* cited by examiner

PREMISES SECURITY

CROSS-REFERENCE TO RELATED APPLICATIONS

The present Application claims priority to U.S. Provisional Patent Application No. 61/873,526, titled: "Systems and Methods for Premises Security," filed on Sep. 4, 2013.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and home security products. Advancements in mobile devices allow users to monitor a home or business. Information related to premises security, however, is not always readily available.

SUMMARY

According to at least one embodiment, a computer-implemented method for premises security is described. In one embodiment, a person passing through a perimeter of a predefined area may be detected via a boundary sensor. Upon detecting the person passing through the perimeter of the predefined area, a camera may be activated to capture an image of the person, the camera being positioned in relation to the predefined area. A notification may be sent to a user determined to be nearest to the predefined area. The notification may include the image of the person.

In one embodiment, the notification may be sent to a monitoring agency according to a setting of a policy defined by the user. A status of an asset located in the predefined area may be monitored via an asset sensor. A movement in relation to the asset may be detected. The asset sensor may include an accelerometer. The notification may indicate detected movement of the asset. A prompt may be provided in the notification. The prompt may include at least a first option to enable activation of an alarm. Upon waiting a predetermined amount of time without a response, the alarm may be activated automatically. The prompt may include a second option to deactivate the automatic activation of the alarm.

In one embodiment, a location of the asset may be tracked via the asset sensor. The asset sensor may include a global positioning system (GPS) sensor. The notification may indicate the location of the asset. A tracking channel may be provided in a channel guide among channels of a television programming service. The notification may include a link to the tracking channel. The location of the asset may be displayed on the tracking channel.

According to at least one embodiment, another computer-implemented method for premises security is described. A proximity of a person in relation to a vehicle may be detected via a proximity sensor. Upon determining the proximity of the person satisfies a predetermined threshold, a notification may be sent to a user. Upon determining the proximity of the person satisfies the predetermined threshold, a camera positioned in relation to the vehicle may be activated. In some embodiments, the person approaching the vehicle may be identified. Upon determining the identity of the person is not associated with the vehicle, the camera positioned in relation to the vehicle may be activated. Upon determining the identity of the person is associated with the vehicle, the notification may be canceled.

In one embodiment, the notification may include an image captured by the activated camera. The camera may be concealed in a dashboard of the vehicle. A location of the vehicle may be tracked via a location sensor on the vehicle. The location sensor may include a GPS sensor. A notification may be provided to the user. The notification may indicate the location of the vehicle. A tracking channel may be provided in a channel guide among channels of a television programming service. The location of the vehicle may be displayed on the tracking channel. An attempt to enter the vehicle by force may be detected via a forced entry sensor. The forced entry sensor may include a glass break sensor and/or a shock sensor. Upon detecting the forced entry, a notification may be sent to the user. Upon detecting the forced entry, an on-board diagnostic of the vehicle may be queried for a status of the vehicle. Information received in response to the query of the on-board diagnostic system may be sent to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
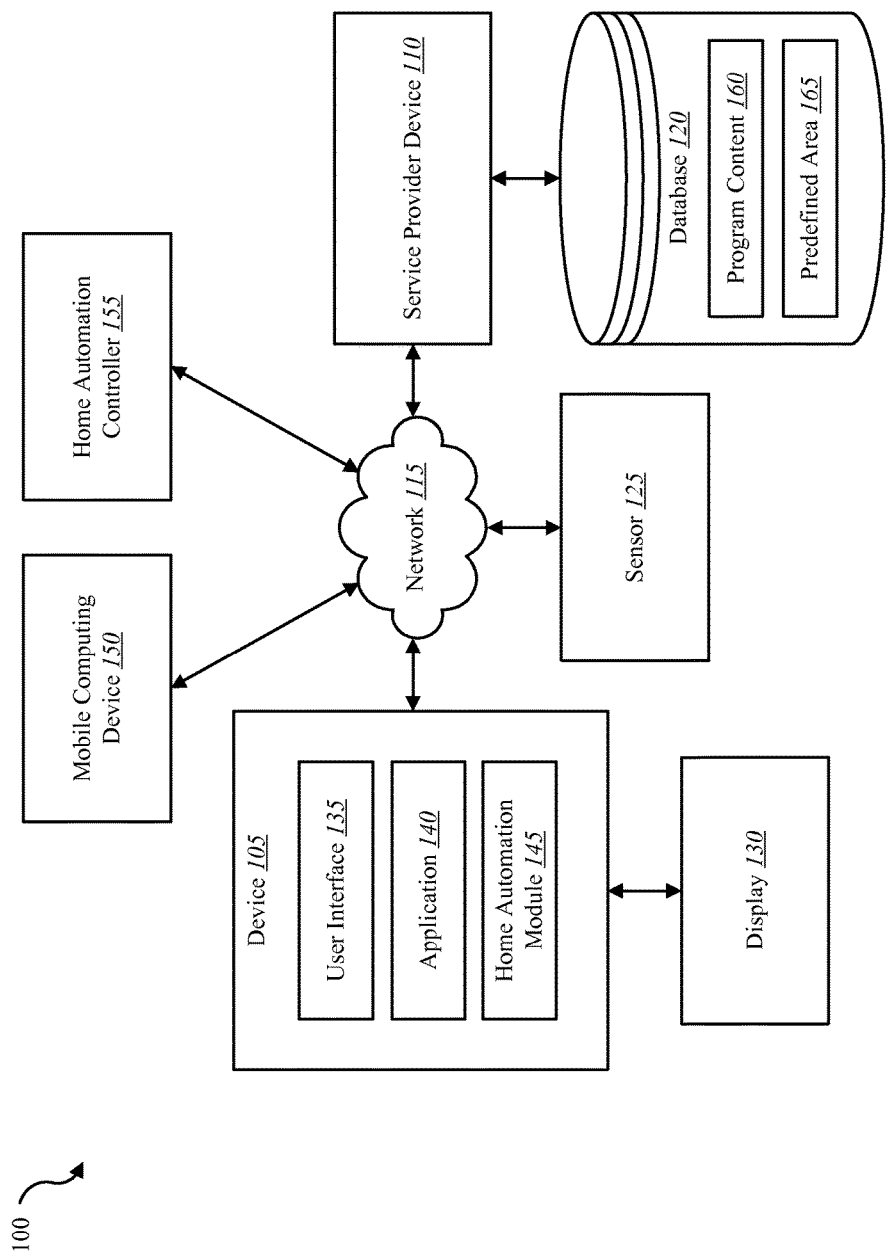
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to home automation. More specifically, the systems and methods described herein relate to premises security in relation to a home automation system. Some embodiments of the systems and methods described herein relate to premises security in relation to an integration of home automation and a subscriber-based media content set top box, such as a satellite and/or cable digital video recorder (DVR).

In one example, a user may desire to receive an alert when someone enters a predefined area. For instance, a homeowner may want to know when a person enters or leaves through a garage. Presently, a sensor may detect when an object disrupts a beam sensor (e.g., infrared (IR) beam sensor, etc.) associated with a garage opener. Upon detecting an object passing through the IR beam, a light switch may be activated turning on a light bulb associated with the garage opener. The homeowner, however, may have to actively monitor the garage area to know whether a person has passed through beam sensor. The present systems and methods provide the means for detecting when a person passes through a predetermined perimeter and providing notification messages upon detecting the person passing through the predetermined perimeter. Moreover, the systems and methods described herein may provide premises security and notifications in relation to a vehicle and a home automation system. Furthermore, the systems and methods described herein may provide premises security and notifications in relation to a channel of a subscriber-based media content set top box.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, service provider device 110, a sensor 125, a display 130, a mobile computing device 150, a home automation controller 155, and a network 115 that allows the device 105, the service provider device 110, the mobile computing device 150, home automation controller 155, and sensor 125 to communicate with one another. Examples of the device 105 include media content set top box, satellite set top box, cable set top box, DVRs, personal video recorders (PVRs), mobile devices, smart phones, personal computing devices, computers, servers, etc. Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like. Examples of sensor 125 include a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heart-beat sensor, breathing sensor, oxygen sensor, carbon dioxide sensor, brain wave sensor, movement sensor, voice sensor, and the like.

Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105. Additionally, or alternatively, sensor 125 may be integrated with a home appliance or fixture such as a light bulb fixture. Sensor 125 may include an accelerometer to enable sensor 125 to detect a movement. For example, sensor 125 may be attached to a set of golf clubs (or some other type of asset) in a garage area. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125 attached to an asset. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a user interface 135, application 140, and home automation module 145. Although the components of the device 105 are depicted as being internal to the device 105, it is understood that one or more of the components may be external to the device 105 and connect to device 105 through wired and/or wireless connections. In some embodiments, application 140 may be installed on mobile computing device 150 in order to allow a user to interface with a function of device 105, home automation module 145, home automation controller 155, and/or service provider device 110.

In some embodiments, device 105 may communicate with service provider device 110 via network 115. Examples of networks 115 include cloud networks, local area networks (LAN), wide area networks (WAN), virtual private networks (VPN), wireless networks (using 802.11, for example), cellular networks (using 3G and/or LTE, for example), Z-Wave networks, etc. In some configurations, the network 115 may include the internet. It is noted that in some embodiments, the device 105 may not include a home automation module 145. For example, device 105 may include application 140 that allows device 105 to interface with home automation controller 155 via home automation module 145 located on another device such as mobile computing device 150 and/or service provider device 110. In some embodiments, device 105, home automation controller 155, and service provider device 110 may include a home automation module 145 where at least a portion of the functions of home automation module 145 are performed separately and/or concurrently on device 105, home automation controller 155, and/or service provider device 110. Likewise, in some embodiments, a user may access the functions of device 105 and/or home automation controller 155 (directly or through device 105 via home automation module 145) from mobile computing device 150. For example, in some embodiments, mobile computing device 150 includes a mobile application that interfaces with one or more functions of device 105, home automation controller 155, home automation module 145, and/or service provider device 110. In some embodiments, at least a portion of the functions of the home automation module 145 may execute on one or more devices located in a cloud network, including any one of the devices illustrated in FIG. 1. For example, one or more computing devices may connect to and communicate with a home automation controller in a home over a cloud network. Thus, one or more functions of the home automation module 145 may be performed on one or more devices in a cloud network. Performance of the function by the one or more devices in the cloud network may include interacting, controlling an aspect of, and/or communicating with one or more devices in the home via the home automation controller.

In some embodiments, service provider device 110 may be coupled to database 120. Database 120 may include program content 160 and information relating to a predefined area 165. For example, device 105 may access program content 160 in database 120 over network 115 via service provider device 110. Database 120 may be internal or external to the service provider device 110. In one example, device 105 may be coupled directly to database 120, database 120 being internal or external to device 105.

Home automation module 145 may allow a user to control (either directly or via home automation controller 155), from a subscription-content media set top box, an aspect of the home of the user, including security, locking or unlocking a door, checking the status of a door, locating a person or item, controlling lighting, thermostat, cameras, and the like. In some configurations, application 140 may enable device 105 to interface with home automation controller 155 via home automation module 145 to provide home automation content to device 105 and/or mobile computing device 150. Thus, application 140, via the home automation module 145, may allow users to control aspects of their home. Further details regarding the home automation module 145 are discussed below.

Figure 2:
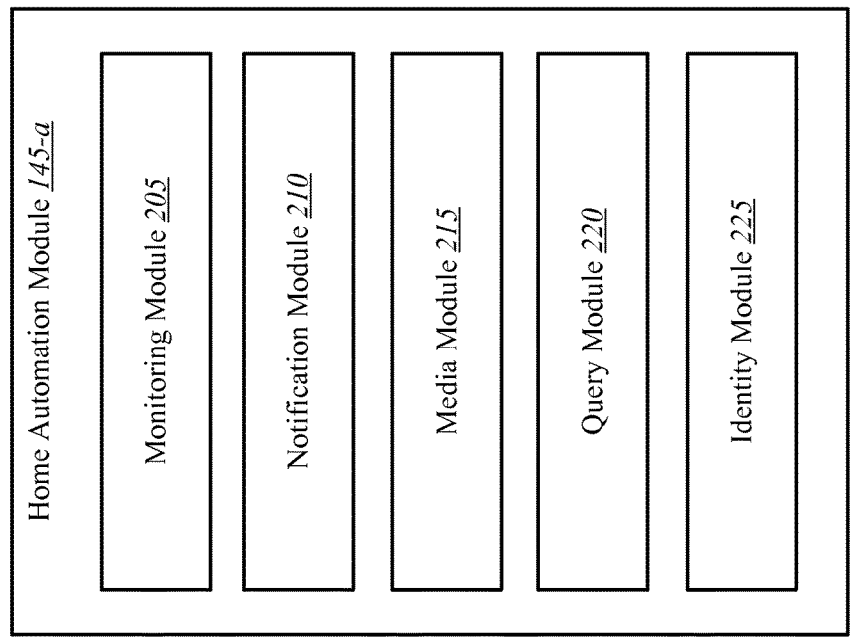
FIG. 2 is a block diagram illustrating one example of a home automation module.

FIG. 2 is a block diagram illustrating one example of a home automation module 145-a. Home automation module 145-a may be one example of home automation module 145 depicted in FIG. 1. As depicted, home automation module 145-a may include monitoring module 205, notification module 210, a media module 215, a query module 220, and an identity module 225.

In some embodiments, service provider device 110 may provide subscriber program content (cable/satellite television programming, for example) to a user via a set top box located in a home, office, etc., of the user. Examples of set top boxes include cable set top boxes, satellite set top boxes, DVRs, PVRs, and the like. Monitoring module 205 may be configured to monitor a status of an asset, of a vehicle, to track an asset, to track a vehicle, etc. Monitoring module 205 may monitor a status of an object in conjunction with sensor 125. For example, sensor 125 may detect a person passing through a perimeter of a predefined area. Upon detecting the person passing through the perimeter of the predefined area, monitoring module 205 may monitor the area and/or an asset located in the area. Monitoring module 205 may be configured to monitor a location of an asset, object, etc.

In some embodiments, monitoring module 205 may monitor a status of an object or asset, such as a golf clubs, tools, power equipment, and other similar items in a garage or other area. Monitoring module 205 may be configured to detect a predetermined change related to an object or the triggering of a predetermined threshold related to the object (e.g., detecting a movement of the object, detecting the object passing through a predefined perimeter, etc.). In one embodiment, monitoring module 205 monitors a location of an asset or object in relation to a predetermined condition. The predetermined condition may include the asset or object entering or leaving a predetermined boundary, such as, entering and/or leaving a garage. The predetermined condition may additionally, or alternatively, include detecting a user performing an action and/or a sequence of actions in relation to the asset, such as moving the asset, removing the asset from a predetermined area, moving the asset beyond a threshold distance from a predetermined location, and the like. The predetermined condition may include detecting a proximity of a person in relation to an asset or object (e.g., detecting a proximity of a person in relation to a vehicle), determining whether the proximity of the person to the asset or object satisfies a predetermined threshold, detecting a forced entry in relation to the asset or object, etc.

In one embodiment, notification module 210 may generate a notification in response to detecting one or more of the predetermined conditions listed above. In some embodiments, notification module 210, in conjunction with the user interface 135, may display a notification on a display connected to a set top box. Notification module 210 may display the notification in relation to a presently viewed channel of the subscriber program content. In some cases, notification module 210 may display the notification in at least a portion of a viewing area of the channel. For example, a user watching content from a satellite DVR on a television may receive a notification displayed on at least a portion of the screen of the television. For example, a notification relating to detecting a predefined action in relation to a set of golf clubs may be generated and sent to the user via email, text message, voicemail, etc. In relation to a set-top box service, the notification may include a scrolling message, a picture-in-picture message, and/or switching to a notification or monitoring channel that includes data and/or information in relation to the detected action. In some embodiments, identity module 225, in conjunction with sensor 125 (e.g., camera sensor, GPS sensor, tracking tag sensor, etc.) and/or a signal from a device carried by the user (e.g., near-field communication (NFC) from a mobile computing device, etc.), may identify a user that is detected to be within a predefined distance from the asset or object. For example, identity module 225 may perform facial recognition and other recognition algorithms based on a captured image of the user to detect and recognize an identity of a user. Additionally, or alternatively, identity module 225 may identify a user based on a detected location of a user. For example, upon the monitoring module 205 detecting a user approaching a certain asset, identity module 225 may determine that the identity of the user is associated with and/or an owner of the asset via tracking the user by GPS sensor, detecting an electronic tracking tag associated with the user (radio-frequency identification (RFID), etc.), and/or detecting a signal from a device carried by the user (e.g., NFC signal from a mobile device).

In response to determining an owner is approaching the asset, the identity module 225 may cancel an alert generated or to be generated by the notification module 210. In some embodiments, notification module 210 may query the identity module 225 to determine whether the identity of the person approaching is known. Based on the response from the identity module 225, the notification module 210 may or may not generate a notification and/or determine which type or types of notifications to generate. For example, upon receiving an indication from the identity module 225 that the user is associated with the asset, the notification module 210 may generate an entry in a system event log. If the response from the identity module 225 indicates the identity of the person is unknown, in addition to generating the entry in a system event log, the notification module 210 may send one or more alerts to one or more users. For example notification module 210 may generate an email, a text message, an audible alert, or a visual alert such as flashing a light, post a message on a control panel, and/or display a message on a screen of a device (e.g., smartphone screen, television, and the like).

In some embodiments, media module 215 may adapt a notification based on certain conditions. Notification module 210 may determine whether to display a notification on a display based on notification rules (e.g., type of program currently being viewed, type of activity detected, etc.) associated with a current state of device 105. For example, media module 215 may determine whether to display the notification the content provided by a set top box that a user is currently viewing. For instance, based on the notification rules, if the type of activity detected is determined to be a minor notification and if a user is watching sports (e.g., boxing match, baseball, football, etc.), media module 215 may alter the type of notification (e.g., scrolling message instead of picture-in-picture), block the message from being displayed on the television, and/or route the notification to another device, such as an email or a text message sent to a smartphone or tablet device. In some cases, notification module 210 may alter the notification based on the current state of the device 105. For one type of programming and set top box content, notification module 210 may show scrolling text across an edge of the television screen. For another type of programming, notification module 210 may play a sound (e.g., a tone, a combination of tones, a recorded voice notification, a text to speech notification, and the like) based on the type of notification. In some embodiments, notification module 210 may alter the destination of the notification based on the type of notification and/or the type of programming currently being viewed by the user. For example, if the notification rules require minimum notification for a certain type of programming, the notification module 210 may display in alternative modes of communication. For instance, notification module 210 may email or text message a notification to a user based on the type of notification, the type of programming the user is currently watching, whether programming is currently being watched, and/or the current location of the user, etc.

In some cases, media module 215 may determine whether to display a notification in relation to programming currently being watched by the user and how to handle the programming based on the type of notification and/or the type of programming. For example, home automation module 145-a may pause the programming for one type of notification, show a pop up message for another type of notification without pausing the programming, split the screen between a window for a security camera view and a window for the programming for another type of notification, and so forth. Additionally, or alternatively, notification module 210 may pause the programming for one type of notification based on one type of programming, block the notification for the same type of notification based on another type of programming, and continue showing the programming for the same type of notification based on a third type of programming.

In some embodiments, upon detecting a predetermined change related to a location of a user or a status of an object, media module 215 may pause subscriber program content currently provided on a channel. For example, the home automation module 145-a may pause and/or record a portion of the content the user was viewing when the notification is displayed. In some cases, the notification may include a picture in picture notification, a text bar, scrolling text, a pop up, or drop down notification message. In some cases, the presently viewed channel may be paused upon the notification module 210 displaying the notification.

In one embodiment, media module 215 may provide subscriber program content to a user via a set top box located in a home of the user. Monitoring module 205 may monitor an aspect of the home of the user. Media module 215, in conjunction with the user interface 135, may provide a monitor channel to display the monitored aspect of the home to the user. The monitor channel may be displayed in a channel guide among channels of the subscriber program content. For example, a subscription to cable or satellite media content may include a channel guide that includes a list of selectable channels and their respective content. Among the list of channels provided by subscription, home automation module 145-a may append one or more home automation channels that are selectable and interact with user commands in a similar manner as the subscription channels in the channel guide.

Media module 215 may provide a tracking channel, similar to the monitor channel described above, to display a map of tracked users and/or objects among channels of the subscriber program content. In some embodiments, home automation module 145-a may provide a home automation preview channel. The home automation preview channel may provide a real-time preview of two or more home automation channels. In some embodiments, home automation module 145-a may split the screen to show the current content provided by a media provider and a location of a user being tracked. Alternatively, home automation module 145-a may display the location of the user being tracked in a picture in picture element over the current channel.

Figure 3:
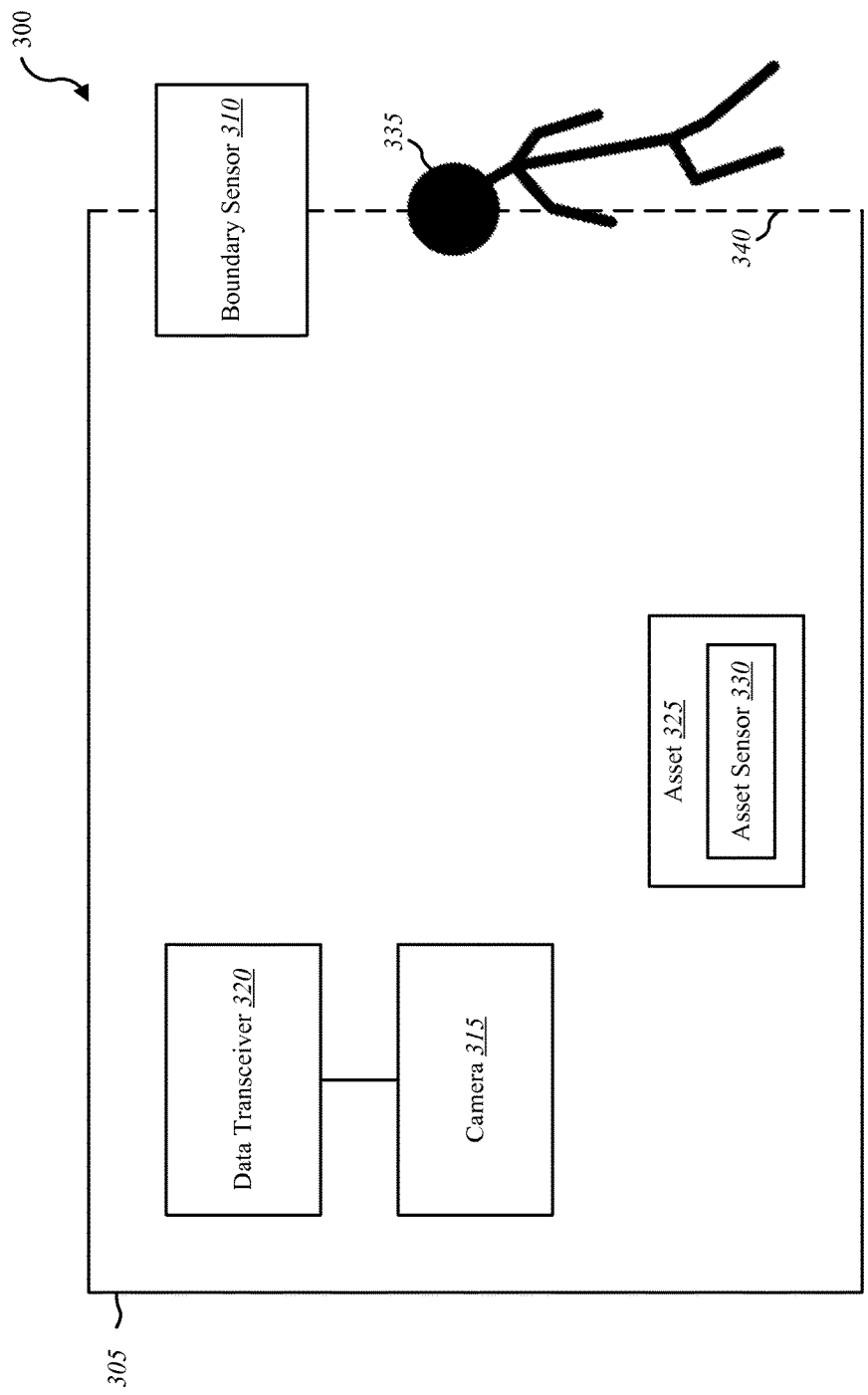
FIG. 3 is a block diagram illustrating one example of an environment for detecting an object passing through a perimeter of a predefined area.

FIG. 3 is a block diagram illustrating one example of an environment 300 for detecting an object passing through a perimeter 340 of a predefined area 305. As depicted, the predefined area 305 may include boundary sensor 310, camera 315, data transceiver 320, and asset 325. Asset 325 may include an asset sensor 330. Sensors 310 and 330 may be one example of sensor 125 of FIG. 1.

In one embodiment, boundary sensor 310 may detect a person 335 passing through a perimeter of a predefined area. Boundary sensor 310 may include an IR beam sensor to detect an interruption of the IR beam, thus detecting an object passing in or out of the predetermined area 305. Upon detecting the person 335 passing through the perimeter 340 of the predefined area 305, home automation module 145 may activate camera 315. Camera 315 may capture an image of the person 335. Camera 315 may be positioned in relation to the predefined area 305 to enable the camera to capture images of object and/or persons passing through the perimeter 340. Upon detecting the person passing through the perimeter of the predefined area, notification module 210 may send a notification to a user. Notification module 210 may send the notification to the user determined to be nearest to the predefined area 340. The notification may include the image of the person captured by camera 315.

In some embodiments, monitoring module 205 may monitor, via an asset sensor 330, a status of an asset 325 located in the predefined area 305. For example, asset sensor 330 may be attached to a set of golf clubs in a garage. The asset sensor 330 may include an accelerometer to enable sensor 330 to detect a movement in relation to the asset 325. Asset 330, in some embodiments, may include a wireless communication device to communicate with home automation module 145 via data transceiver 320. A notification may be generated notifying a user of the detected movement in relation to the asset 325. The notification may indicate the detected person passing through the perimeter 340 of the predefined area 305 and the detected movement of the asset 325. Additionally, or alternatively, the notification may include a prompt. The prompt may include at least a first option to enable the user to activate an alarm in association with the detected movement of the asset 330. Upon waiting a predetermined amount of time, home automation module 145 may automatically activate the alarm. The prompt may include a second option to enable the user to deactivate the automatic activation of the alarm. Additionally, or alternatively, the second option may include one or more options that allow a user to review information before making a decision (e.g., dismissing a notification, sounding an alarm, notifying law enforcement and/or emergency response personnel, etc.). For example, the second option may include providing an option that allows the user to review captured images and/or video, review a system history (e.g., order/timing of events, etc.), to communicate with another person through the system (e.g., intercom, phone call, text message, etc.), and/or to notify others (e.g., notify a neighbor of an intruder) before making a decision in response to the notification.

In some embodiments, asset sensor 330 may include a GPS sensor. Thus, monitoring module 205 may track a location of the asset 325 via the asset sensor. Notification module 210 may provide a notification to the user indicating the location of the tracked asset 325. Media module 215 may provide a tracking channel in a channel guide among channels of a television programming service to display the tracking of the asset 325. Television programming service may include a cable and/or satellite subscription programming service, over the air programming, internet television programming, and the like. The notification may include a link to the tracking channel enabling the user to switch to the channel where the location of the asset 325 is displayed on the tracking channel.

Figure 4:
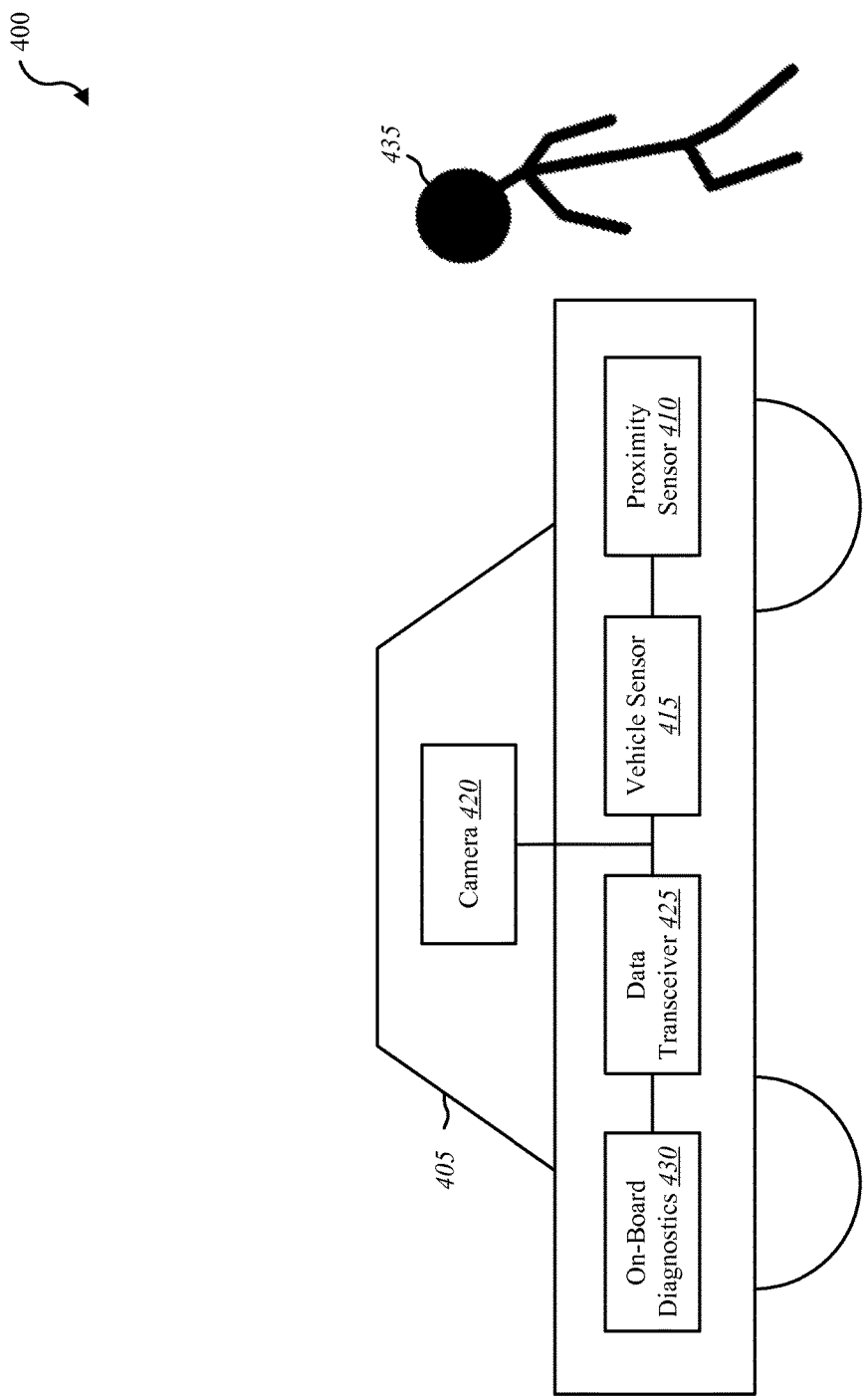
FIG. 4 is a block diagram illustrating one example of an environment for detecting a proximity of a person relative to an object.

FIG. 4 is a block diagram illustrating one example of an environment 400 for detecting a proximity of a person relative to an object. Environment 400 may include a vehicle 405. Vehicle 405 may include proximity sensor 410, vehicle sensor 415, camera 420, data transceiver 425, and on-board diagnostics 430. Sensors 410 and 415 may be one example of sensor 125 of FIG. 1. In some embodiments, at least a portion of home automation module 145 may be located in vehicle 405.

In one embodiment, proximity sensor 410 may detect a proximity of a person in relation to vehicle 405. Upon determining the proximity of the person 435 satisfies a predetermined threshold of distance, notification module 210 may send a notification to a user associated with associated with the vehicle (e.g., owner of the vehicle, a person in charge of monitoring the vehicle, etc.). Upon determining the proximity of the person satisfies the predetermined threshold, home automation module 145 may activate a camera 420. Camera 420 may be positioned in relation to vehicle 405 (e.g., within the vehicle, outside with a view of the vehicle, etc.). The notification may include an image captured by the activated camera 420. In some embodiments, camera may be concealed within vehicle 405. For example, camera 405 may be concealed in a dashboard of vehicle 405.

In some embodiments, vehicle sensor 415 may track a location of vehicle 405 via a location sensor on the vehicle. For example, vehicle 405 may include a GPS sensor external to vehicle sensor 415 communicatively connected to vehicle sensor 415. In some embodiments, vehicle sensor 415 may include a GPS sensor internally. Notification module 210 may provide a notification to the user indicating the location of the vehicle 405. Media module 215 may provide a tracking channel in a channel guide among channels of a television programming service to enable the display of the location of the vehicle on the tracking channel.

In one embodiment, vehicle sensor 415 may detect an attempt to enter vehicle 405 by force. The vehicle sensor 415 may include, internally or externally, a glass break sensor and/or a shock sensor to enable detection of attempts of forced entry. Upon detecting the attempt to enter vehicle 405 forcibly, notification module 210 may provide a notification to the user. In some embodiments, upon detecting the forced entry, query module 220 may query an on-board diagnostic 430 of vehicle 405 for a status of the vehicle 405. Notification module 210 may send information received in response to the query of the on-board diagnostic system to the user. In some embodiments in conjunction with monitoring module 205, a user may place vehicle 405 in one or more security states. For example, the user may place the vehicle in a combination of one or more states, including "at work," "at home," "armed," "unarmed," "arm sleep," etc. Based on the present state of the vehicle, notification module may determine whether to generate a notification and/or determine what type of notification to send. For example, placing the vehicle in a state of "arm sleep" may trigger the notification module 210 into sending a notification every time a user is detected approaching the vehicle. Placing the vehicle in a state of "armed at work," however, may prevent the notification module 210 from generating an alert if the identity module 225 identifies the user that is approaching the vehicle as an owner of the vehicle.

Figure 5:
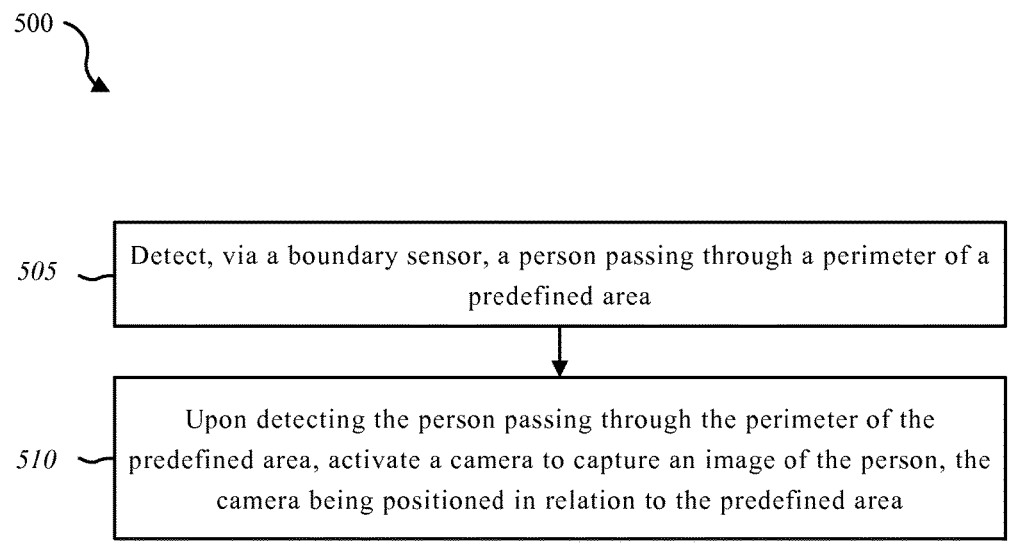
FIG. 5 is a flow diagram illustrating one embodiment of a method for detecting a person passing through a perimeter of a predefined area.

FIG. 5 is a flow diagram illustrating one embodiment of a method 500 for detecting a person passing through a perimeter of a predefined area. In some configurations, the method 500 may be implemented by the home automation module 145 illustrated in FIG. 1 or 2. In some configurations, the method 500 may be implemented in conjunction with the application 140 and/or the user interface 135 illustrated in FIG. 1.

At block 505, a person may be detected, via a boundary sensor, passing through a perimeter of a predefined area. At block 510, upon detecting the person passing through the perimeter of the predefined area, a camera may be activated to capture an image of the person, the camera being positioned in relation to the predefined area. At block 515, a notification may be sent to a user determined to be nearest to the predefined area. The notification may include an image of the person captured by the camera.

Figure 6:
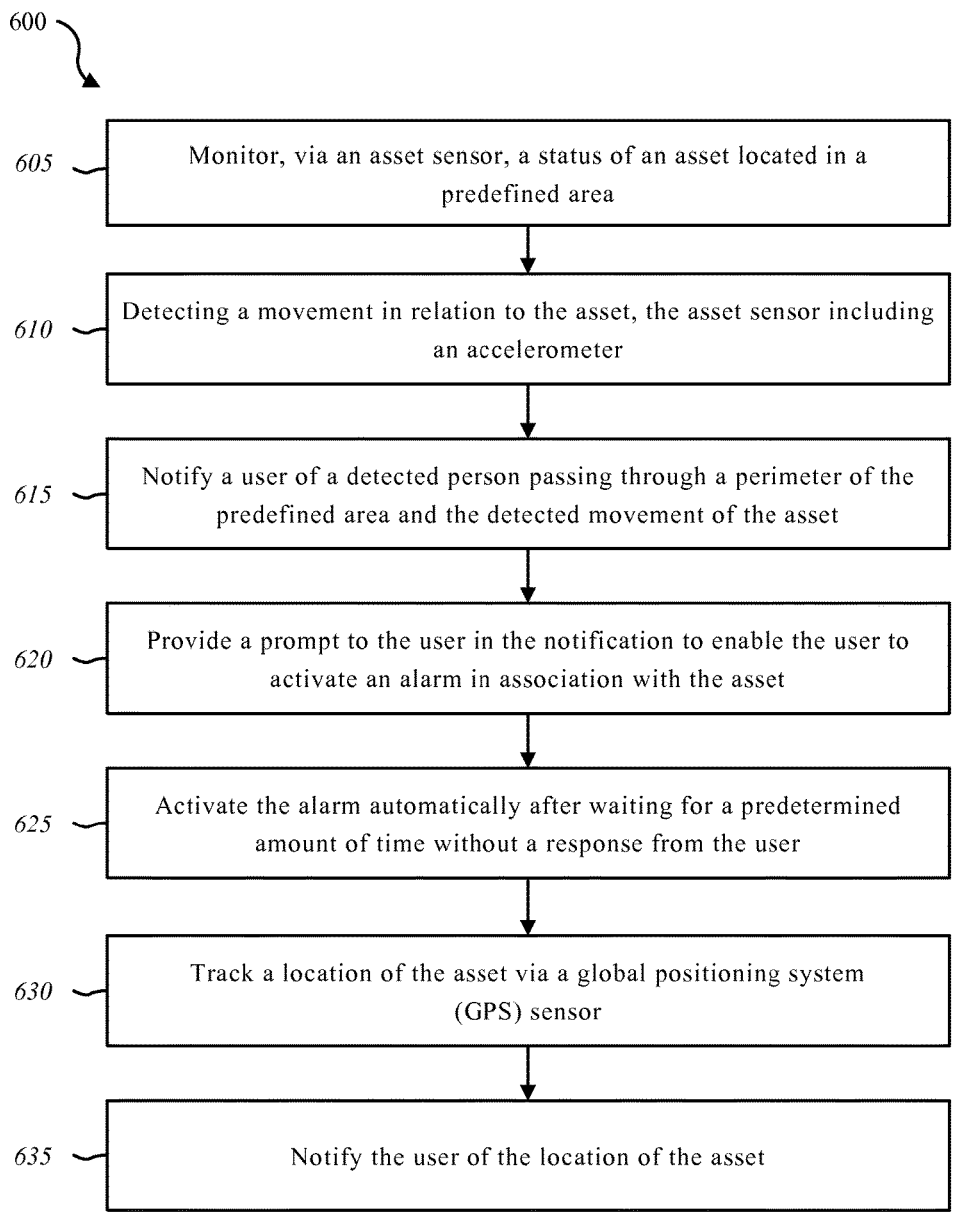
FIG. 6 is a flow diagram illustrating one embodiment of a method for generating a notification upon detecting movement of an asset.

FIG. 6 is a flow diagram illustrating one embodiment of a method 600 for generating a notification upon detecting movement of an asset. In some configurations, the method 600 may be implemented by the home automation module 145 illustrated in FIG. 1 or 2. In some configurations, the method 600 may be implemented in conjunction with the application 140 and/or the user interface 135 illustrated in FIG. 1.

At block 605, a status of an asset located in the predefined area may be monitored via an asset sensor. At block 610, a movement in relation to the asset may be detected via an accelerometer. At block 615, a user may be notified of a detected person passing through a perimeter of the predefined area and the detected movement of the asset. At block 620, a prompt may be provided to the user in the notification. The prompt may enable the user to activate an alarm in association with the asset. At block 625, the alarm may be activated automatically after a predefined period of time. The prompt may include a second option to enable the user to deactivate the automatic activation of the alarm. At block 630, a location of the asset may be tracked via the asset sensor. The asset sensor may include a GPS sensor. At block 635, a user may be notified of the location of the asset.

Figure 7:
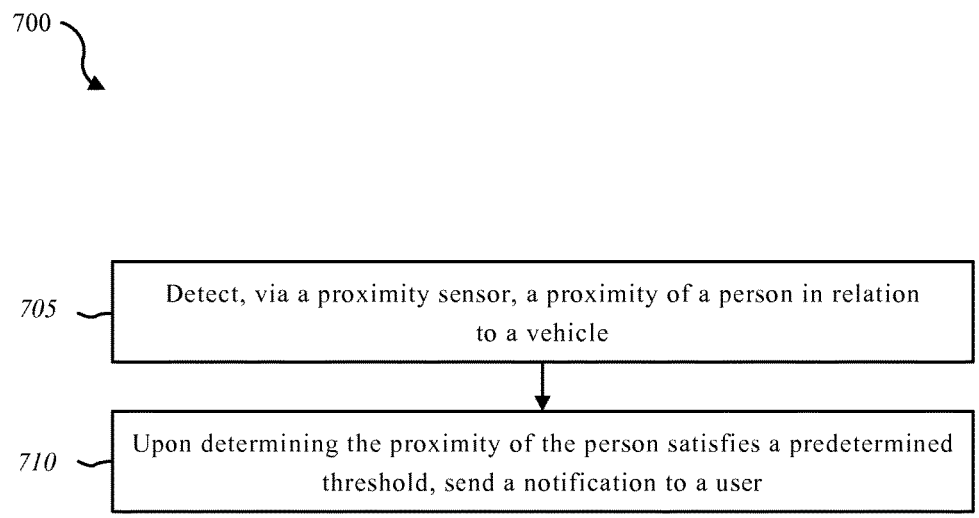
FIG. 7 is a flow diagram illustrating one embodiment of a method for detecting a proximity of a person relative to a vehicle.

FIG. 7 is a flow diagram illustrating one embodiment of a method 700 for detecting a proximity of a person relative to a vehicle. In some configurations, the method 700 may be implemented by the home automation module 145 illustrated in FIG. 1 or 2. In some configurations, the method 700 may be implemented in conjunction with the application 140 and/or the user interface 135 illustrated in FIG. 1.

At block 705, a proximity of a person in relation to a vehicle may be detected via a proximity sensor. At block 710, upon determining the proximity of the person satisfies a predetermined threshold, a notification may be sent to a user.

Figure 8:
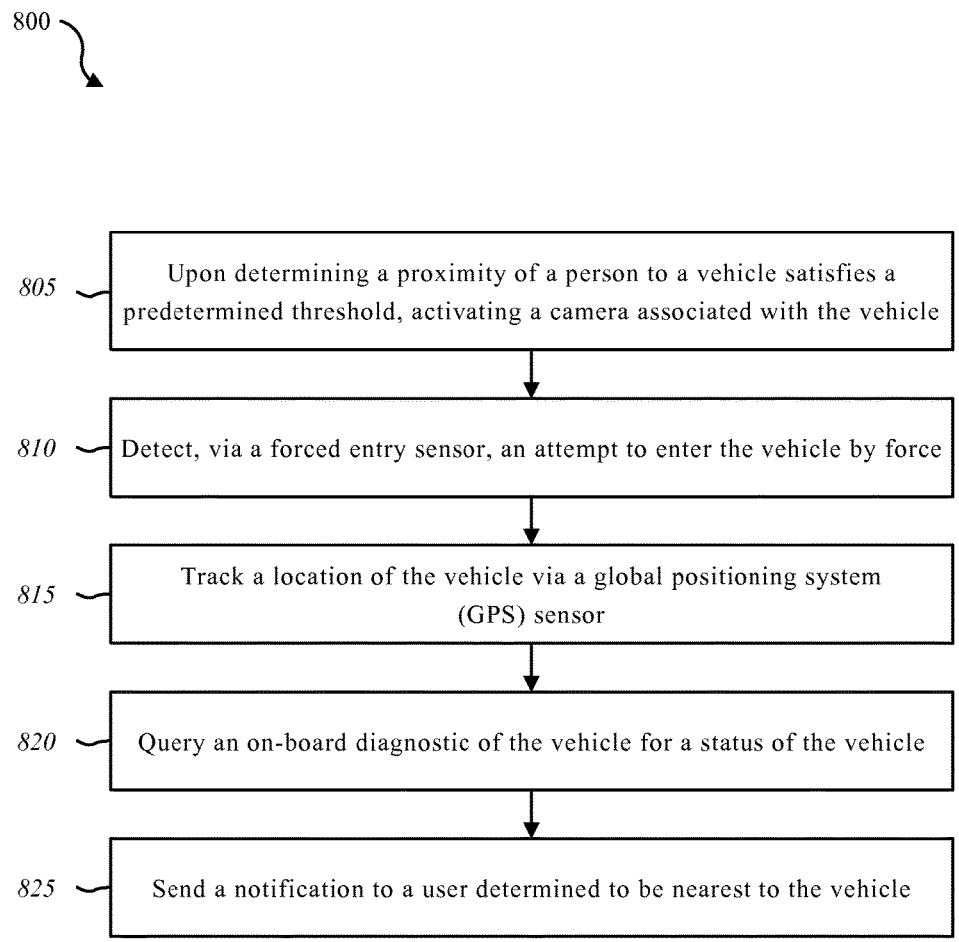
FIG. 8 is a flow diagram illustrating one embodiment of a method for generating a notification upon detecting a predefined action relative to a vehicle.

FIG. 8 is a flow diagram illustrating one embodiment of a method 800 for generating a notification upon detecting a predefined action relative to a vehicle. In some configurations, the method 800 may be implemented by the home automation module 145 illustrated in FIG. 1 or 2. In some configurations, the method 800 may be implemented in conjunction with the application 140 and/or the user interface 135 illustrated in FIG. 1.

At block 805, upon determining the proximity of the person to a vehicle satisfies a predetermined threshold, a camera positioned in relation to the vehicle may be activated. At block 810, an attempt to enter the vehicle by force may be detected via a forced entry sensor. At block 815, a location of the vehicle may be tracked via a location sensor on the vehicle (e.g., a GPS sensor). At block 820, upon detecting the forced entry, an on-board diagnostic of the vehicle may be queried for a status of the vehicle. At block 825, a notification may be sent to a user determined to be nearest to the vehicle. The notification may include information regarding the detected proximity of the person to the vehicle, the detected forced entry attempt, the tracked location of the vehicle, and/or results of the query of the on-board diagnostics of the vehicle.

Figure 9:
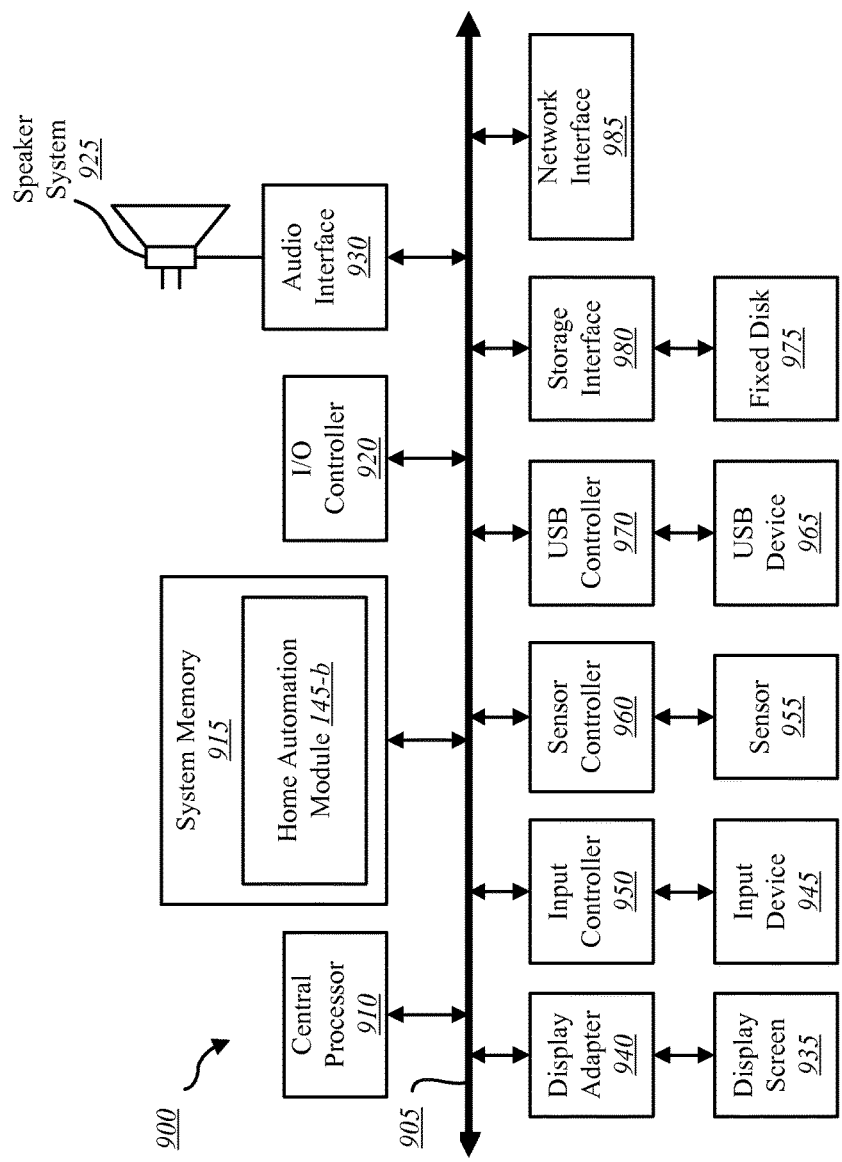
FIG. 9 depicts a block diagram of a computer system suitable for implementing the present systems and methods.

FIG. 9 depicts a block diagram of a controller 900 suitable for implementing the present systems and methods. The controller 900 may be an example of the set top box device 105, mobile computing device 150, and/or home automation controller 155 illustrated in FIG. 1. In one configuration, controller 900 includes a bus 905 which interconnects major subsystems of controller 900, such as a central processor 915, a system memory 920 (typically RAM, but which may also include ROM, flash RAM, or the like), an input/output controller 925, an external audio device, such as a speaker system 930 via an audio output interface 935, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 915 and system memory 920, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the home automation module 145-b to implement the present systems and methods may be stored within the system memory 920. Applications (e.g., application 140) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 920 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for premises security, the method comprising:
    detecting, via a boundary sensor, a person passing through a perimeter of a predefined area and approaching an asset located within the predefined area;
    detecting that a proximity of the person in relation to the asset satisfies a predetermined threshold;
    upon detecting that the proximity of the person in relation to the asset satisfies the predetermined threshold, activating a camera to capture an image of the person, the camera being positioned in relation to the predefined area;
    determining whether the person approaching the asset located within the predefined area is identifiable;
    generating a notification based at least in part on an identity of the person approaching the asset and a setting of a policy defined by a user determined to be nearest to the predefined area; and
    sending the generated notification for display on a device associated with the user, the notification being sent based at least in part on a content being currently viewed on the device, and the notification including the image of the person.

2. The method of claim 1, further comprising:
    sending the notification to a monitoring agency according to the setting of the policy defined by the user.

3. The method of claim 1, further comprising:
    monitoring, via an asset sensor, a status of the asset located within the predefined area.

4. The method of claim 3, further comprising:
    detecting a movement in relation to the asset, wherein the asset sensor comprises an accelerometer, the notification indicating detected movement of the asset.

5. The method of claim 4, further comprising:
    providing a prompt in the notification, the prompt comprising at least a first option to enable activation of an alarm.

6. The method of claim 5, further comprising:
    upon waiting a predetermined amount of time without a response, automatically activating the alarm, wherein the prompt comprises a second option to deactivate the automatic activation of the alarm.

7. The method of claim 3, further comprising:
    tracking a location of the asset via the asset sensor, wherein the asset sensor comprises a global positioning system (GPS) sensor, the notification indicating the location of the asset.

8. The method of claim 6, further comprising:
    providing a tracking channel in a channel guide among channels of a television programming service, the notification comprising a link to the tracking channel; and
    displaying the location of the asset on the tracking channel.

9. A computing device configured for premises security, comprising:
    a processor;
    memory in electronic communication with the processor, wherein the memory stores computer executable instructions that when executed by the processor cause the processor to perform the steps of:

detecting, via a boundary sensor, a person passing through a perimeter of a predefined area and approaching an asset located within the predefined area;

detecting that a proximity of the person in relation to the asset satisfies a predetermined threshold;

upon detecting that the proximity of the person in relation to the asset satisfies the predetermined threshold, activating a camera to capture an image of the person, the camera being positioned in relation to the predefined area;

determining whether the person approaching the asset located within the predefined area is identifiable;

generating a notification based at least in part on an identity of the person approaching the asset and a setting of a policy defined by a user determined to be nearest to the predefined area; and sending the generated notification for display on a device associated with the user, the notification being sent based at least in part on a content being currently viewed on the device, and the notification including the image of the person.

10. The computing device of claim 9, wherein the instructions executed by the processor cause the processor to perform the steps of:

sending the notification to a monitoring agency according to the setting of the policy defined by the user.

11. The computing device of claim 9, wherein the instructions executed by the processor cause the processor to perform the steps of:

monitoring, via an asset sensor, a status of the asset located within the predefined area.

* * * * *